United States Patent [19]

Hisgen et al.

[11] Patent Number: 4,728,713
[45] Date of Patent: Mar. 1, 1988

[54] WHOLLY AROMATIC MESOMORPHIC POLYESTER IMIDES AND THE PREPARATION THEREOF

[75] Inventors: Bernd Hisgen, Limburgerhof; Michael Portugall, Wachenheim; Udo Reiter, Telgte, all of Fed. Rep. of Germany

[73] Assignee: BASF Aktiengesellschaft, Ludwigshafen, Fed. Rep. of Germany

[21] Appl. No.: 937,718

[22] Filed: Dec. 4, 1986

[30] Foreign Application Priority Data

Dec. 4, 1985 [DE] Fed. Rep. of Germany ....... 3542857

[51] Int. Cl.⁴ ..................... C08G 63/54; C08G 69/44
[52] U.S. Cl. ..................... 528/183; 528/184; 528/190; 528/193; 528/194; 528/210; 528/220
[58] Field of Search ..................... 528/183–184, 528/190, 193, 194, 210, 220

[56] References Cited

U.S. PATENT DOCUMENTS

| | | | |
|---|---|---|---|
| 4,118,372 | 10/1978 | Schaefgen | 528/190 |
| 4,176,223 | 11/1979 | Irwin | 528/170 |
| 4,351,918 | 9/1982 | Charbonneau et al. | 524/602 |
| 4,375,530 | 3/1983 | Hay et al. | 524/605 |
| 4,383,105 | 5/1983 | Irwin | 528/170 |
| 4,398,019 | 8/1983 | Cox et al. | 528/183 |
| 4,414,381 | 11/1983 | Griffin et al. | 528/190 |
| 4,499,256 | 2/1985 | Blundell et al. | 528/172 |
| 4,564,669 | 1/1986 | Dicke et al. | 528/173 |
| 4,623,732 | 11/1986 | Peters | 548/480 |
| 4,632,798 | 12/1986 | Eickman et al. | 528/183 X |

FOREIGN PATENT DOCUMENTS 0081900 6/1983 European Pat. Off. .

*Primary Examiner*—Lucille M. Phynes
*Attorney, Agent, or Firm*—Keil & Weinkauf

[57] ABSTRACT

Wholly aromatic mesomorphic polyester imides which form a liquid-crystalline fiber-forming melt below 320° C. and are composed of (a) from 5 to 35 mole % of repeat units of the formulae I and/or II

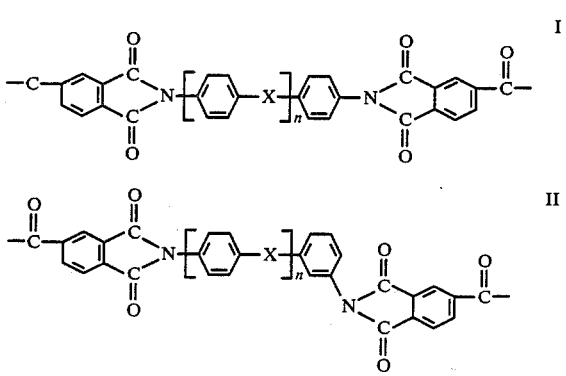

where the Xs and n's can be identical or different, each X being —O—, —S—, —SO₂—, —CO—, —CH₂— or =C(CH₃)₂ and n being 0 or 1, (b) from 0 to 30 mole % of repeat units of the formulae III and/or IV

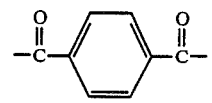

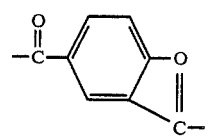

(c) a molar amount corresponding to the total amount of components a and b of one or more of the repeat units of the formulae V, VI, VII or VIII

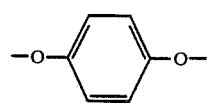

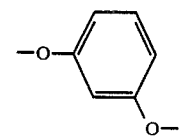

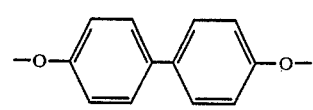

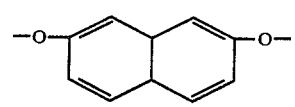

(d) not less than 10 mole % of repeat units of the formula IX

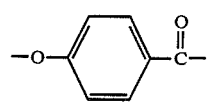

(e) if desired from 5 to 25 mole % of repeat units of the formula X

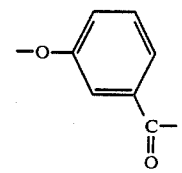

the molar proportions of components a, b, c, d, and e adding up to 100 mole % in each case, and the preparation thereof.

10 Claims, No Drawings

WHOLLY AROMATIC MESOMORPHIC POLYESTER IMIDES AND THE PREPARATION THEREOF

The present invention relates to wholly aromatic mesomorphic polyester imides which form a liquid-crystalline fiber-forming melt below 320° C.

Liquid-crystalline polyester imides are known. However, these polymers are in need of improvement in heat distortion resistance, processability and especially abrasion resistance. EP Application No. 81,900 disclosed polyester amides which are at least 40% coaxial units such as aromatic dicarboxylic acids, hydroxy aromatic carboxylic acids, diphenols and aminophenols and contain a sufficient amount of nonlinear radicals which are derived from aromatic amino compounds or binuclear aromatic sulfones. However, no indication is given as to which composition is required to obtain the desired combination of properties. U.S. Pat. No. 4,176,223 describes polyester imides which are based on naphthalene dicarboxylic acid, substituted hydroquinone and 4-(4'-carboxy-phthalimido)benzoic acid. However, these polymers require temperatures of 330° C. or more for processing from the melt. The same is true of the polyester imides disclosed in U.S. Pat. No. 4,383,105, which are based on hydroxynaphthalene carboxylic acid, terephthalic acid, p-hydroxybenzoic acid and 4-(4'-hydroxyphthalimido)phenol.

It is an object of the present invention to provide wholly aromatic mesomorphic polyester imides which form a liquid-crystalline fiber-forming melt below 320° C. and thus are easy to process and moreover have a high heat distortion resistance, a high abrasion resistance and high resilience.

We have found that this object is achieved with wholly aromatic mesomorphic polyester imides which form a liquid-crystalline fiber-forming melt below 320° C. and are composed of (a) from 5 to 35 mole % of repeat units of the formulae I and/or II

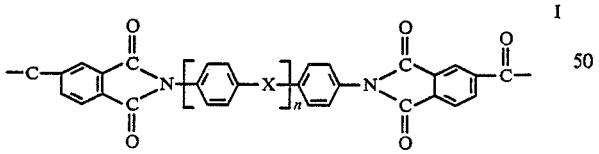

I

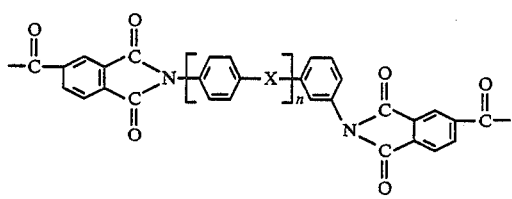

II where the Xs and n's can be identical or different, each X being —O—, —S—, —SO$_2$—, —CO—, —CH$_2$— or =C(CH$_3$)$_2$ and n being 0 or 1, (b) from 0 to 30 mole % of repeat units of the formulae III and/or IV

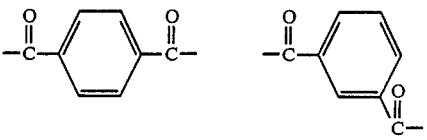

III (c) a molar amount corresponding to the total amount of (a) and (b) of one or more of the repeat units of the formulae V, VI, VII or VIII

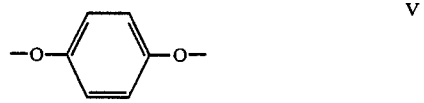

V

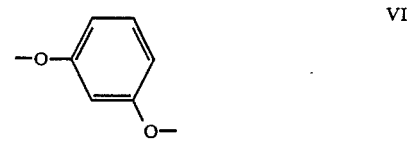

VI

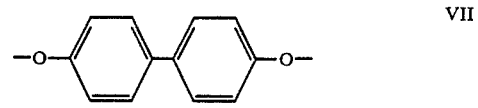

VII

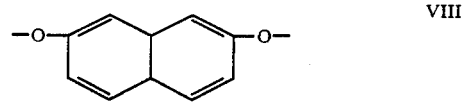

VIII (d) not less than 10 mole % of repeat units of the formula IX

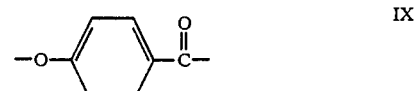

IX (e) if desired from 5 to 25 mole % of repeat units of the formula X

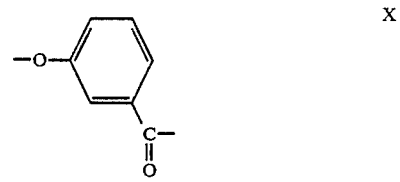

X the molar proportions of components a, b, c, d, and e adding up to 100 mole % in each case.

The novel wholly aromatic polyester imides have the advantage of combining a heat distortion resistance with a smooth abrasion-resistant surface. The novel polyester imides further have a high stiffness, strength and resilience. In addition, the novel polyester imides are substantially resistant to chemicals and flame-retardant. Finally, the novel polyester imides have the advantage of being processable from the melt below 320° C.

The liquid-crystalline state of the polyester imides can be detected with a polarization microscope by a method described in German Published Application DAS No. 2,520,819. Applied in a thickness of 10 μm between glass plates and viewed between crossed polarizers, the polymer melts have textures which can be ascribed to a mesomorphic phase.

The polyester imides according to the invention are composed of (a) from 5 to 35 mole %, in particular from 7 to 31 mole %, of repeat units of the formulae I and/or II

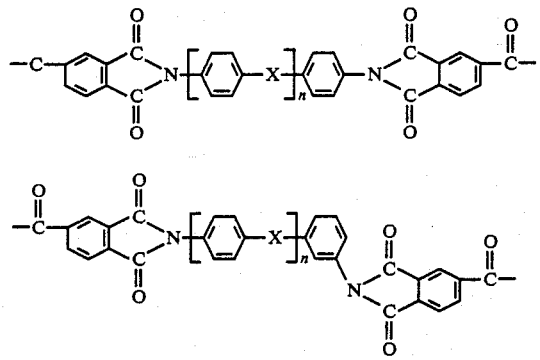

where the Xs and n's can be identical or different, X being —O—, —S—, —SO$_2$—, —CO—, —CH$_2$— or =C(CH$_3$)$_2$—, in particular —O—, —SO$_2$— or —CH$_2$—, and n being 0 or 1, in particular 1; suitable starting compounds being for example 4,4'-bis[(4-carboxy)-N-phthalimido]diphenyl ether
4,4'-bis[(4-carboxy)-N-phthalimido]diphenylmethane
4,4'-bis[(4-carboxy)-N-phthalimido]diphenyl sulfone
4,4'-bis[(4-carboxy)-N-phthalimido]diphenyl sulfide
4,4'-bis[(4-carboxy)-N-phthalimido]diphenyl ketone
3,4'-bis[(4-carboxy)-N-phthalimido]diphenyl ether
4,4'-bis[(4-carboxy)-N-phthalimido]diphenyl sulfide
3,4'-bis[(4-carboxy)-N-phthalimido]diphenyl sulfone
3,4'-bis[(4-carboxy)-N-phthalimido]diphenyl ketone
3,4'-bis[(4-carboxy)-N-phthalimido]diphenylmethane (b) from 0 to 30 mole %, in particular from 0 to 20 mole %, of repeat units of the formulae III and/or IV

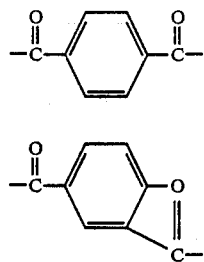

A suitable starting compound for units of the formula III being for example terephthalic acid and for those of the formula IV isophthalic acid;

(c) a molar amount corresponding to the total amount of components (a) and (b) of one or more of the repeat units of the formulae V, VI, VII or VIII.

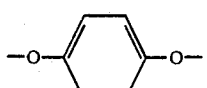

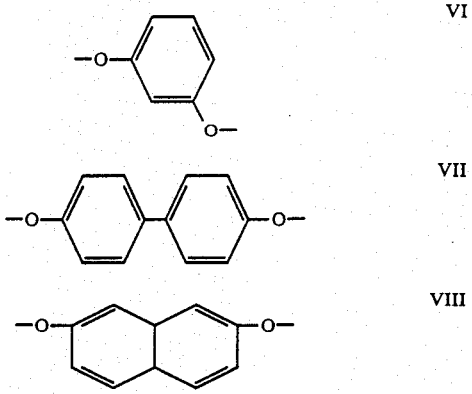

Starting compounds being for example hydroquinone for units of the formula V, resorcinols for units of the formula VI, 4,4'-dihydroxybiphenyl for units of the formula VII, and 2,7-dihydroxynaphthalene for units of the formula VIII;

(d) not less than 10 mole %, in particular not less than 20 mole %, of repeat units of the formula IX

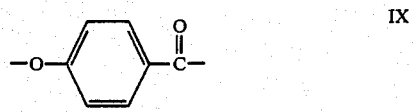

A suitable starting compound being for example p-hydroxybenzoic acid;

(e) if desired from 5 to 25, in particular from 10 to 20, mole % of repeat units of the formula X

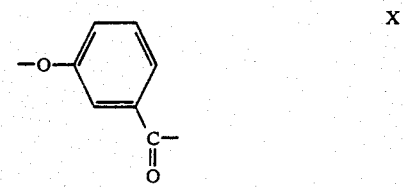

A suitable starting compound being for example m-hydroxybenzoic acid.

Preferred polyester imides contain as component c from 10 to 31 mole % of repeat units of the formula V and/or from 5 to 25 mole % of repeat units VI, VII or VIII. A particular preferred component c comprises repeat units of the formulae V, VI and/or VII and mixtures thereof.

Preferred wholly aromatic polyester imides have a glass transition temperature Tg of ≧140° C., in particular ≧150° C. This glass transition temperature is measured by the DSC method described by K. H. Illers et al. in Makromol. Chem. 127 (1969), 1 ff. The wholly aromatic liquid-crystalline polyester imides form a liquid-crystalline line fiber-forming melt at below 320° C. Preference is also give to liquid-crystalline aromatic polyester imides which have partial crystallinity at >200° C. and <300° C.

The liquid-crystalline polyester imides according to the invention can be obtained in a manner similar to that described for example in U.S. Pat. Nos. 4,375,530 and 4,118,372.

In an advantageous embodiment the polyester imides according to the invention are obtained in a single-stage process by converting the underivatized starting materials using anhydrides of lower fatty acids, for example fatty acids of 2 to 4 carbon atoms, in particular acetic anhydride. This conversion may be catalyzed with catalysts of the type described for example in EP-A-131,846 (page 9), used in amounts of from 0.001 to 1% by weight, based on the starting materials. The starting materials are heated together with the fatty acid anhydride, which is advantageously present in a molar excess of at least 5%, based on the hydroxyl groups present, with stirring in an inert gas atmosphere to a temperature at which reflux occurs. Advantageously the temperature is increased in stages, for example to 130°–200° C. in not more than 5 hours, preferably up to 2 hours, and the temperature is then increased to 250°–350° C., for example in the course of 2–2.5 hours, while excess fatty acid anhydrides and fatty acids are distilled off. To complete the reaction, it has been found to be advantageous to employ reduced pressure, for example 200–0.1 mbar, toward the end.

It is a remarkable and unforeseeable feature of this single-stage process that the desired polymers are obtained in a relatively short time in a troublefree and complete reaction without catalysts. This is all the more remarkable as the large number of chemically different hydroxyl groups would be expected to lead to differences in reactivity and hence to inadequate polymer synthesis.

The wholly aromatic liquid-crystalline polyester imides thus obtained from the condensation in the melt can be further condensed in the solid state, for example at 150°–250° C., until the desired viscosity is obtained. This postcondensation in solid phase can take place not only before but also after thermoplastic processing. Advantageously the solid phase condensation is carried out in the presence of inert gases such as nitrogen.

The polyester imides according to the invention can contain conventional additives in active amounts. Suitable additives are stabilizers and oxidation inhibitors, agents against thermal decomposition and decomposition by ultraviolet light, lubricants, mold release agents, colorants such as dyes and pigments, fibrous or pulverulent fillers and reinforcing agents, nucleating agents or plasticizers.

The stabilizers can be added to the polymers at any stage of processing or when completed. Preferably the stabilizers are added early on to prevent the onset of decomposition before the polymers are protected.

Suitable oxidation inhibitors and heat stabilizers are for example halides of metals of group I of the periodic table, for example sodium, potassium or lithium halides together with copper(I) halides, for example chlorides, bromides or iodides; and also sterically hindered phenols, hydroquinones, different substituted representatives of these groups and combinations thereof. In general, such oxidation inhibitors and heat stabilizers are used in amounts of up to 1% by weight, based on the polymer.

Suitable UV stabilizers are for example different substituted resorcinols, salicylates, benzotriazoles and benzophenones. These UV stabilizers are generally employed in amounts of up to 2% by weight, based on the polymer.

It is also possible to add organic dyes such as nigrosine and pigments, for example titanium dioxide, cadmium sulfide, cadmium sulfide selenide, phthalocyanines, ultramarine blue or carbon black, for example in amounts of up to about 5% by weight.

Suitable pulverulent and fibrous fillers and reinforcing agents are for example carbon fibers, glass fibers, amorphous silica, asbestos, calcium silicate, aluminum silicate, magnesium carbonate, kaolin, chalk, quartz powder, mica or feldspar. Reinforcing agents and fillers are generally employed in amounts of up to 70% by weight, based on the polymer.

Suitable nucleating agents are for example talcum, calcium fluoride, sodium phenylphosphinate, aluminum oxide or finely divided tetrafluoroethylene.

Plasticizers which are employed in amounts of up to 20% by weight, based on the polymer, are for example dioctyl phthalate, dibenzyl phthalate, butyl benzyl phthalate, hydrocarbon oils, N-n-butylbenzenesulfonamide, and o- and p-tolueneethylsulfonamide.

The wholly aromatic liquid-crystalline polyester imides according to the invention are suitable for preparing filaments, films, foams and industrial moldings by injection molding, pressing or extruding.

The moldings prepared from the polyester imides according to the invention have excellent mechanical properties such as stiffness, strength and resilience. They are remarkably resistant to chemicals and flame-retardant. They also have a high heat distortion resistance and a smooth abrasion-resistant surface. The polyester imides according to the invention are therefore highly suitable for preparing articles for electrical engineering, data processing, automotive construction and other industrial sectors. But they can also be used as surface coating materials, in pulverulent dispersion or as film.

The invention is illustrated by the following Examples.

EXAMPLE 1

0.1 mol of terephthalic acid, 0.26 mol of 4-hydroxybenzoic acid, 0.07 mol of hydroquinone, 0.04 mol of dihydroxybiphenyl, 0.09 mol of 2,7-dihydroxynaphthalene and 0.1 mol of the compound

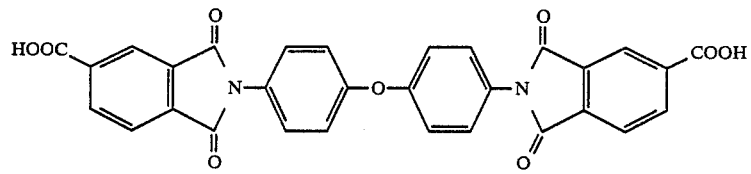

and 120 ml of acetic anhydride are heated with stirring under nitrogen from 150° C. to 300° C. in the course of 2 h 50 min, while excess acetic anhydride and acetic acid are distilled off. The pressure is then reduced to 95 mbar in the course of 65 min to give a viscous, pale, fiber-forming melt. The polymer melt and the cold polymer have a pearlescent luster. The polymer has a smooth, hard and abrasion-resistant surface. DSC measurements indicate a glass transition temperature of 153° C. The intrinsic viscosity is 0.86 dl/g, measured at 60°

EXAMPLE 2

0.182 mol of 4-hydroxybenzoic acid, 0.077 mol of hydroquinone, 0.063 mol of 4,4'-dihydroxybiphenyl, 0.14 mol of the compound

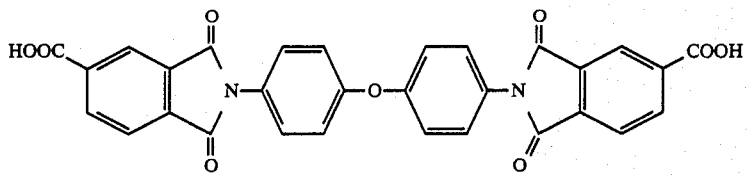

and 122 ml acetic anhydride are heated with stirring under nitrogen from 150° C. to 300° C. in the course of 2 h 50 min, while excess acetic anhydride and acetic acid are distilled off. The pressure is then reduced to 60 mbar in the course of 30 min to give a viscous fiber-forming melt. The polymer melt and the cold polymer have a pearlescent luster. The polymer has a smooth, hard and abrasionresistant surface. DSC measurements indicate a glass transition temperature of 158° C. The intrinsic viscosity is 1.03 dl/g, measured at 60° C. in an 0.1% strength (wt./vol.) solution in pentafluorophenol.

EXAMPLE 3

0.182 mol of 4-hydroxybenzoic acid, 0.14 mol of hydroquinone, 0.14 mol of the compound

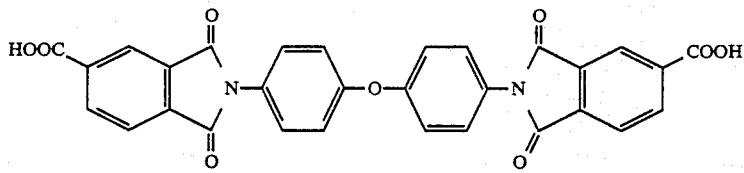

and 150 ml of acetic anhydride are heated with stirring under nitrogen from 150° C. to 300° C. in the course of 2 h 50 min, while excess acetic anhydride and acetic acid are distilled off. The pressure is then reduced to 200 mbar in the course of 10 min to give a viscous fiber-forming melt. The polymer melt and the cold polymer have a pearlescent luster. The polymer has a smooth, hard and abrasion-resistant surface. DSC measurements indicate a glass transition temperature of 162° C. and a melting point of 295° C. The intrinsic viscosity is 0.93 dl/g, measured at 60° C. in an 0.1% strength (wt./vol.) solution in pentafluorophenol.

EXAMPLE 4

0.1 mol of isophthalic acid, 0.26 mol of 4-hydroxybenzoic acid, 0.07 mol of hydroquinone, 0.04 mol of dihydroxybiphenyl, 0.09 mol of 2,7-dihydroxynaphthalene, 0 1 mol of the compound

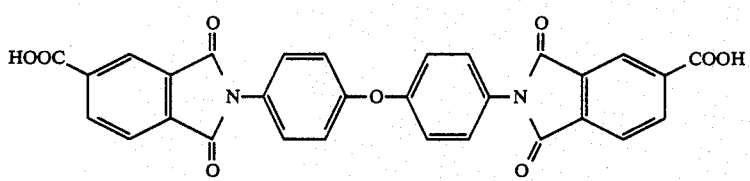

and 134 ml of acetic anhydride are heated with stirring under nitrogen from 150° C. to 300° C. in the course of 2 h 50 min, while excess acetic anhydride and acetic acid are distilled off. The pressure is then reduced to 150 mbar in the course of 18 min to give a viscous fiber-forming melt. The polymer melt and the cold polymer have a pearlescent luster. The polymer has a smooth, hard and abrasion-resistant surface. DSC measurements indicate a glass transition temperature of 159° C. The intrinsic viscosity is 0.92 dl/g, measured at 60° C. in an 0.1% strength (wt./vol.) solution in pentafluorophenol.

EXAMPLE 5

0.085 mol of terephthalic acid, 0.221 mol of 4-hydroxybenzoic acid, 0.085 mol of hydroquinone, 0.085 mol of dihydroxybiphenyl, 0.085 mol of

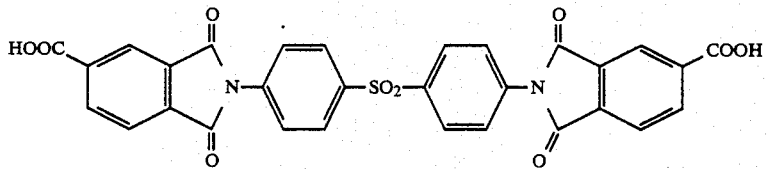

and 140 ml of acetic anhydride are heated with stirring under nitrogen from 150° C. to 300° C. in the course of 2 h 50 min, while excess acetic anhydride and acetic acid are distilled off. Then the pressure is reduced to 85 mbar in the course of 40 min to give a viscous fiber-forming melt. The polymer melt and the cold polymer have a pearlescent luster. The polymer has a smooth, hard and abrasion-resistant surface. DSC measurements indicate a glass transition temperature of 184° C. and a melting point of 290° C.

EXAMPLE 6

0.08 mol of terephthalic acid, 0.208 mol of 4-hydroxybenzoic acid, 0.056 mol of hydroquinone, 0.032 mol of dihydroxybiphenyl, 0.072 mol of 2,7-dihydroxynaphthalene, 0.08 mol of the compound

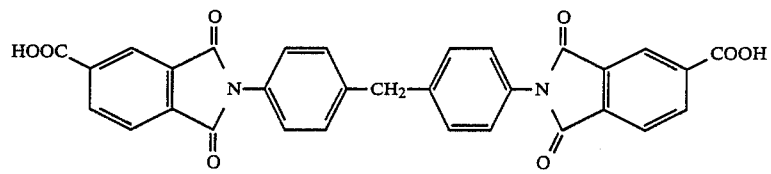

and 91 ml of acetic anhydride are heated with stirring under nitrogen from 150° C. to 300° C. in the course of 2 h 50 min, while excess acetic anhydride and acetic acid are distilled off. The pressure is then reduced to 30 mbar in the course of 30 min to give a viscous fiber-forming melt. The polymer melt and the cold polymer have a pearlescent luster. The polymer has a smooth, hard and abrasion-resistant surface. DSC measurements indicate a glass transition temperature of 158° C. The intrinsic viscosity is 0.59 dl/g, measured at 60° C. in an 0.5% strength (wt./vol.) solution in 4-chlorophenol.

We claim:
1. A wholly aromatic mesomorphic polyester imide which forms a liquid-crystalline fiber-forming melt below 320° C. and is composed of
   (a) from 5 to 35 mole % of repeat units of the formulae I and/or II

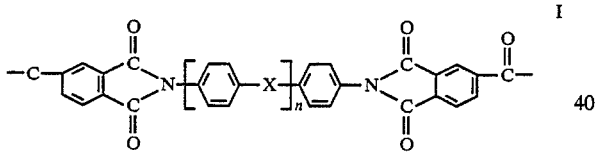

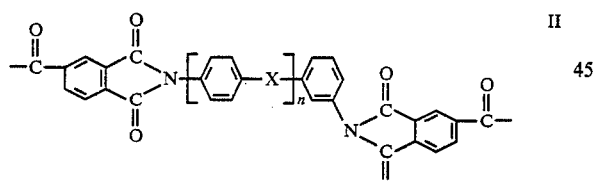

where the Xs and N's can be identical or different, each X being —O—, —S—, —SO$_2$—, —CO—, —CH$_2$— or =C(CH$_3$)$_2$ and n being 0 or 1,
   (b) from 0 to 30 mole % of repeat units of the formulae III and/or IV

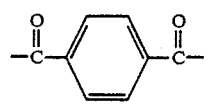

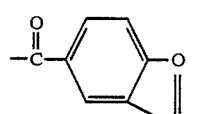

(c) a molar amount corresponding to the total amount of components a and b of one or more of the repeat units of the formula V, VI, VII or VIII

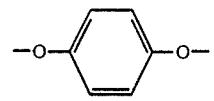

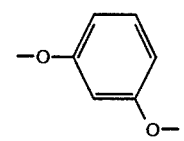

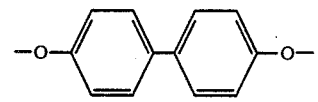

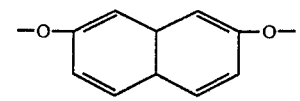

(d) not less than 10 mole % of repeat units of the formula IX

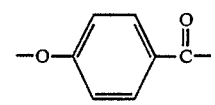

(e) if desired from 5 to 25 mole % of repeat units of the formula X

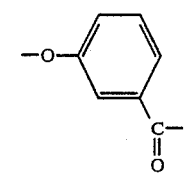

the molar proportions of components a, b, c, d, and e adding up to 100 mole % in each case.
2. A wholly aromatic mesomorphic polyester imide as claimed in claim 1, composed of
   (a) from 7 to 31 mol % of repeat units of the formulae I and/or II
   (b) from 0 to 20 mol % of repeat units of the formulae III and/or IV
   (c) a molar amount corresponding to the total amount of components a and b of one or more of the repeat units of the formula V, VI, VII or VIII
   (d) not less than 20 mol % of repeat units of the formula IX
   (e) from 10 to 20 mol % of repeat units of the formula X.

3. A wholly aromatic mesomorphic polyester imide as claimed in claim 1, which contains as component c from 10 to 31 mol % of repeat units of the formula V and/or from 5 to 25 mol % of repeat units of the formulae VI, VII and/or VIII.

4. A wholly aromatic mesomorphic polyester imide as claimed in claim 1, which contains as component c repeat units of the formulae V, VI and/or VII or mixtures thereof.

5. A wholly aromatic mesomorphic polyester imide as claimed in claim 1, which has a glass transition temperature $Tg = 140°$ C.

6. A process for preparing a wholly aromatic mesomorphic polyester imide as claimed in claim 1 by reacting the starting materials in the form of the underivatized hydroxy and carboxy compounds in a single-stage process in the molar ratios described in the presence of excess fatty acid anhydride at elevated temperature and distilling fatty acid anhydride and fatty acid out of the reaction mixture.

7. A process as claimed in claim 6, wherein the wholly aromatic polyester imide, after the condensation in the melt, is postcondensed in the solid phase at 150°–250° C.

8. A fiber from a polyester imide as claimed in claim 1.

9. A film from a polyester imide as claimed in claim 1.

10. A molding from a polyester imide as claimed in claim 1.

* * * * *